Figure 3:
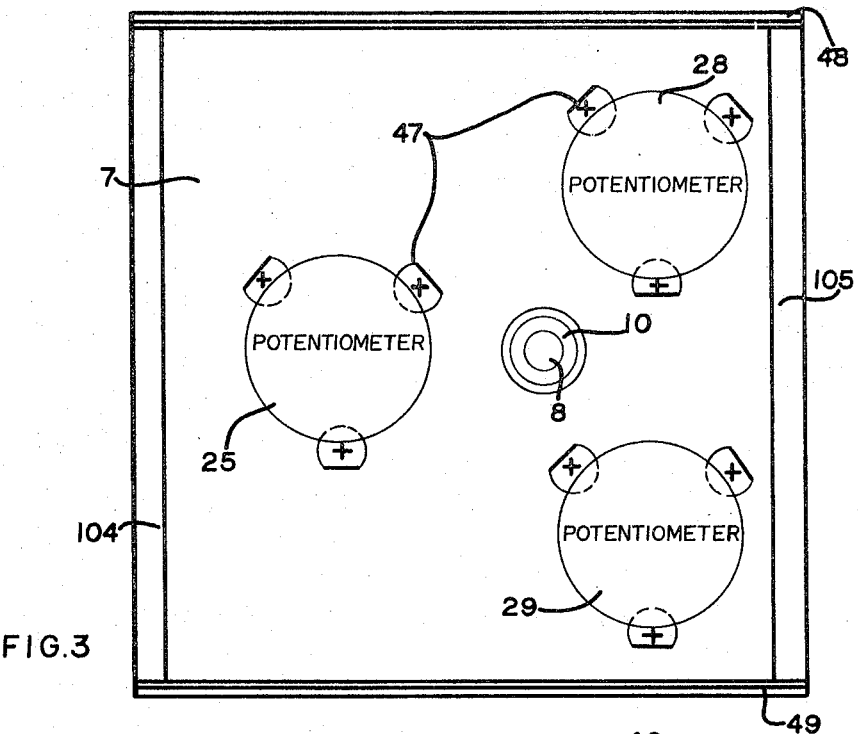

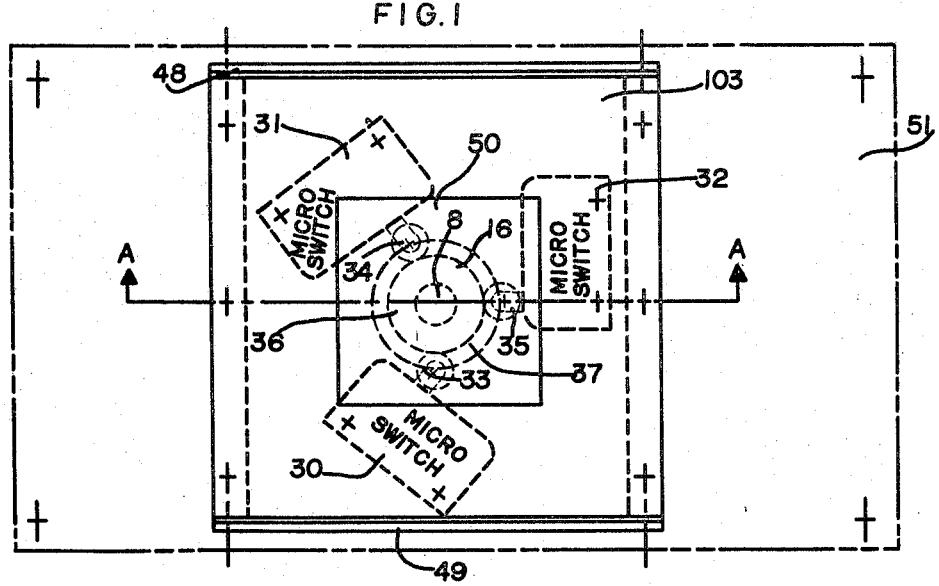
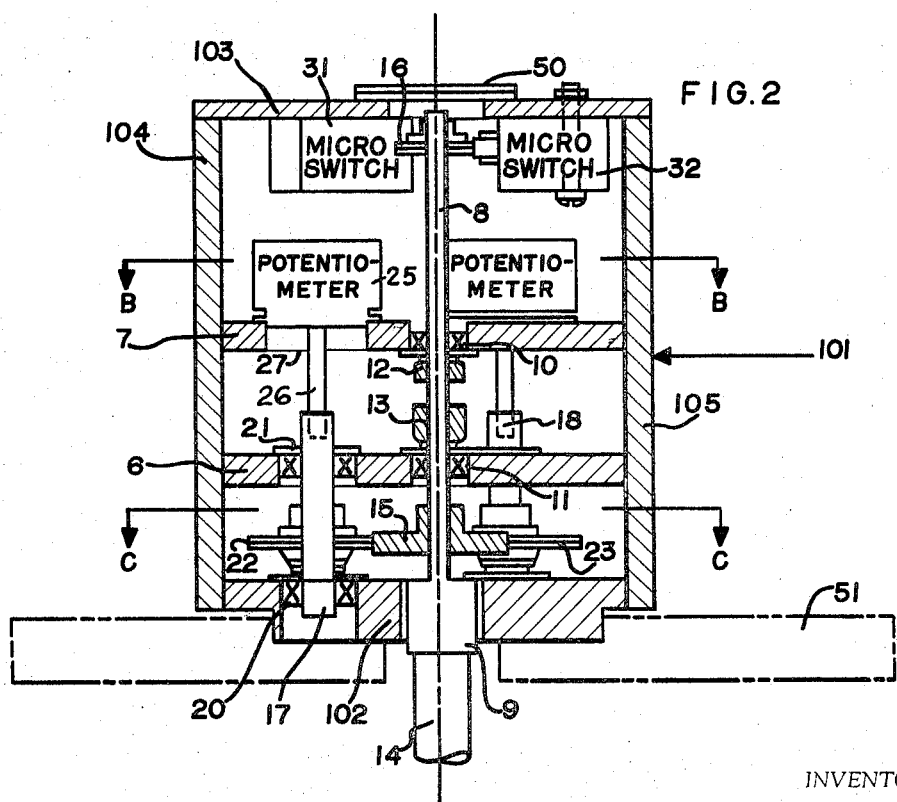

though it in axial alignment with shaft 17. Hence rotation of shaft 8 is transmitted directly to the slider of the potentiometer via gears 15 and 22 and shafts 17 and 26. Potentiometers 28 and 29 (not shown) are also mounted on shelf 7 with their shafts in axial alignment with and coupled to shafts 18 and 19 (not shown) respectively, each one of the arrangements being exactly the same as that of the potentiometer 25. Therefore, the sliders of the three potentiometers 25, 28 and 29 (not shown) follow simultaneously all rotary movements of shaft 8 no matter how small or how great these movements may be. In FIGURE 3, the fasteners indicated at 47 secure the potentiometers to the shelf. Preferably, potentiometers 25, 28 and 29 are identical linear potentiometers.

United States Patent Office 3,296,521
Patented Jan. 3, 1967

3,296,521
POSITION REGULATING DEVICE
John Wildberger, Peterborough, Ontario, Canada, assignor to Canadian General Electric Company, Limited, Toronto, Ontario, Canada, a company of Canada
Filed Apr. 17, 1964, Ser. No. 360,613
3 Claims. (Cl. 323—80)

This invention relates to a screw position regulator used in an automatic gauge control system for a metal rolling mill. In particular, the invention relates to a new and improved way of obtaining a signal representative of screw position as a regulator feedback signal.

In a prior art system for automatic control of gauge in a rolling mill some means is provided to indicate accurately the actual position of one work roll with respect to the other work roll, which means may be an indicator coupled mechanically to each of the screws used to position the rolls. A simple type of indicator is a linear potentiometer coupled to a screw of the roll screwdown, the output from such a potentiometer being an analog signal. In an arrangement such as this, the slider of the potentiometer is driven by the screw, and since the screw travel is very great, it is extremely difficult to correlate slider travel with screw travel. If the gearing between the screw and the slider is such that the travel of the screw through its full range moves the slider through the full range of the potentiometer, the potentiometer is much too insensitive to be a practical instrument. In other words, only a very small portion of the potentiometer would ever be used to give the feedback signal because the range of gauge rolled is very much less than the total travel of the screw, and consequently the gain of the system would be much too low. To overcome this limitation, prior art systems used a continuous potentiometer having many taps on its resistor, any two of which could be selected by means of stepping switches for feeding current through that portion of the resistor in contact with the slider at the time. This placed the slider in an optimum working range. The large number of taps on the potentiometer tended to limit its accuracy, and the adjustments necessary in setting-up a large number of stepping switches for proper operation of the potentiometer tended to be tedious and time consuming.

It is an object of my invention, therefore, to provide an improved device for obtaining an electrical representation of the physical position of a screw adjusting the rolls separation in a metal rolling mill.

My invention avoids the aforementioned tapped potentiometer and the stepping switches required with it. I employ two or more standard linear potentiometers, preferably three, geared to a screw of the mill, a switch associated with each potentiometer and a cam coupled mechanically to the screw for actuating the switches. The cam itself and its relation to the switches is such that at least one potentiometer is always energized, the particular potentiometer selected having its slider in an optimum position for zeroing the rolls, i.e., calibrating the system when the work rolls are in a definite relative position.

The invention is set forth with particularity in the appended claims. The principles and characteristics of the invention, as well as other objects and advantages are revealed and discussed through the medium of the illustrative embodiments appearing in the specification and drawings which follow.

Figure 4:
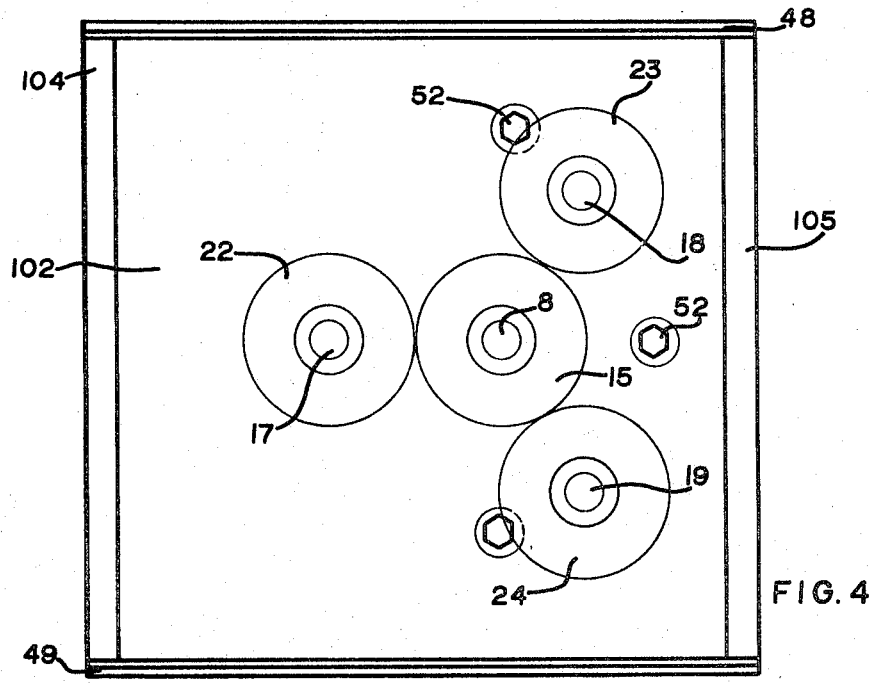
Figure 5:
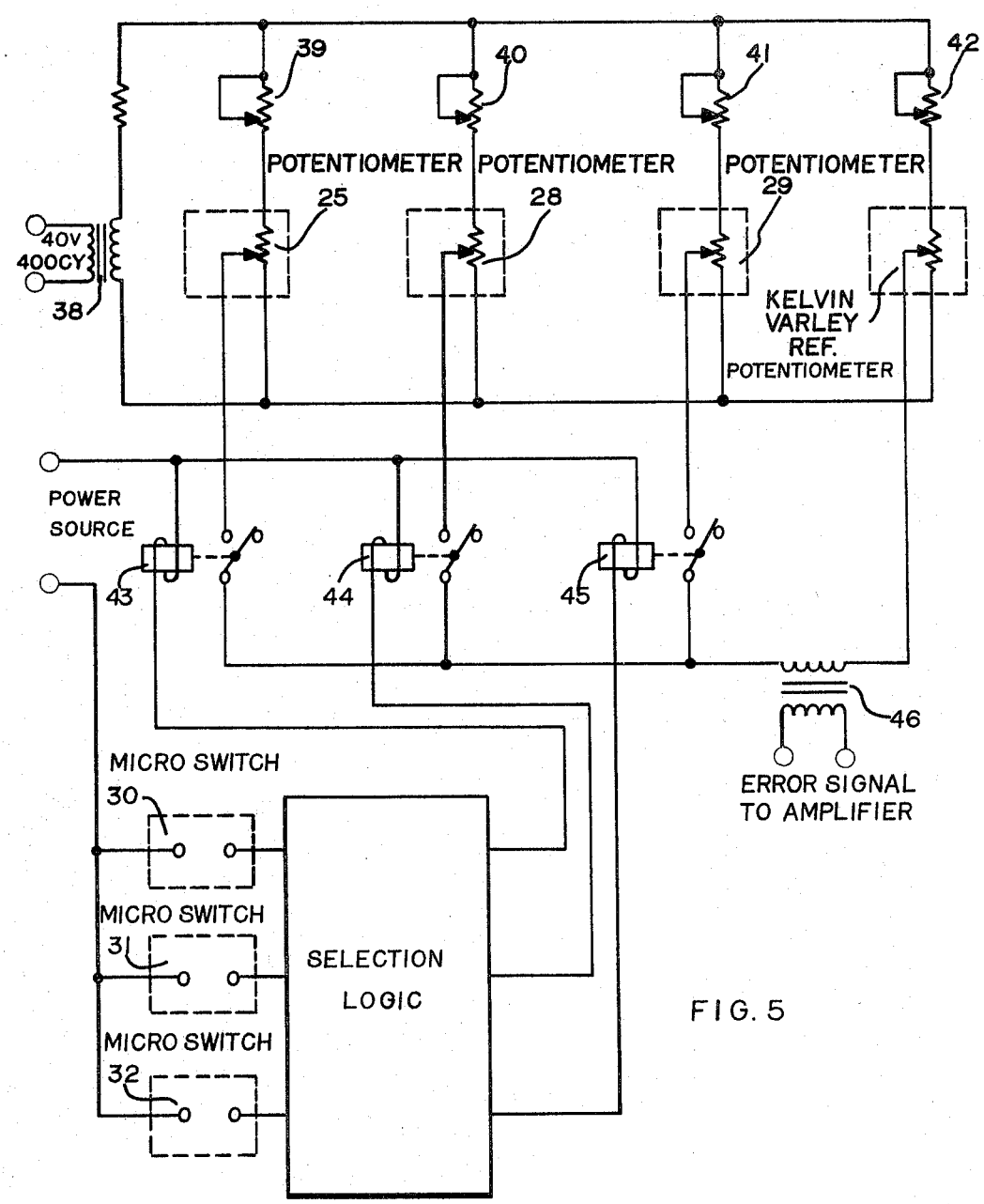

In the drawings:
FIGURE 1 is a plan view of the device.
FIGURE 2 is a section in elevation taken along A—A of FIGURE 1.
FIGURE 3 is a section taken along B—B of FIGURE 2.
FIGURE 4 is a section taken along C—C of FIGURE 2.
FIGURE 5 is an electrical circuit in which the device may be used.

Referring now to the drawings, in FIGURE 2, numeral 101 denotes a frame structure having a base 102, a top wall 103, side walls 104 and 105 and a pair of shelves 6 and 7. The base, top wall and shelves are spaced apart in parallel relation as shown in FIGURE 2 and they are secured to the two end walls by means such as screws to form a rigid frame structure.

A shaft 8 projects upwardly into the frame centrally thereof and transversely of the base and shelves passing through aligned apertures in the base and shelves. Aperture 9 in base 102 provides a substantial clearance for the shaft, and the apertures in the shelves contain bearings 10 and 11 on which the shaft is supported for rotation. Collars 12 and 13 are secured to the shaft to prevent axial movement thereof. End 14 of shaft 8 extending below the base is adapted to be coupled mechanically to a screw of a mill either directly or through gears such that the shaft rotates with the screw. A gear 15 is secured to shaft 8 between base 102 and shelf 6, and a cam 16 is secured to the upper end of shaft 8 just below top wall 103.

Three stub shafts 17, 18 and 19 (relative positions shown in FIGURE 4), are supported for rotation on axes parallel to the axis of shaft 8 by means of two bearings for each shaft, one of which is fitted into an aperture in base 102 and the other in an aperture in shelf 6. The two bearings 20 and 21 for shaft 17 are shown in FIGURE 2 and illustrate the bearing arrangement for shafts 18 and 19 as well. Shafts 17, 18 and 19 are spaced equally from shaft 8 and also equally from one another, i.e., at 120° intervals the same distance from shaft 8, as shown in FIGURE 4. In FIGURE 2 each one of the stub shafts has a gear secured thereto between base 102 and shelf 6. The three gears 22, 23, and 24 mesh with gear 15 as shown in FIGURE 4. Hence shaft 8 drives shafts 17, 18 and 19 through the gear train consisting of drive gear 15 and driven gears 22, 23 and 24. Gears 22, 23 and 24 are all antibacklash gears so that there will be no looseness between them and gear 15.

In FIGURE 2, the upper end of shaft 17 is connected to the lower end of shaft 26 of potentiometer 25 which is supported on shelf 7 with its shaft 26 projecting downwardly through an enlarged opening 27 in the shelf in axial alignment with shaft 17. Hence rotation of shaft 8 is transmitted directly to the slider of the potentiometer via gears 15 and 22 and shafts 17 and 26. Potentiometers 28 and 29 (not shown) are also mounted on shelf 7 with their shafts in axial alignment with and coupled to shafts 18 and 19 (not shown) respectively, each one of the arrangements being exactly the same as that of the potentiometer 25. Therefore, the sliders of the three potentiometers 25, 28 and 29 (not shown) follow simultaneously all rotary movements of shaft 8 no matter how small or how great these movements may be. In FIGURE 3, the fasteners indicated at 47 secure the potentiometers to the shelf. Preferably, potentiometers 25, 28 and 29 are identical linear potentiometers.

In FIGURE 1, three micro switches 30, 31 and 32 are mounted on the under surface of top wall 103 around cam 16 and are spaced equally from one another and from shaft 8. Switch 30 has an actuator 33, switch 31 an actuator 34 and switch 32 an actuator 35 for opening and closing the contacts of the three switches. The switches are operated by means of cam 16 which has two concentric cam surfaces 36 and 37 of which 37 is on a longer radius than 36. When an actuator is riding on surface 36 the contacts in the switch are in a normal state, but when the actuator is driven to its other position by cam surface 37 the contacts change state, i.e., if the contacts are normally open, cam surface 37 will drive the actuator to its other position where the contacts close and remain closed as long as the actuator is on surface 37.

Cam 16 is adjustable in such a way that the length of its surface 37 can be varied in order to provide for proper setting of the micro switches. As already pointed out, at least one switch must always be in the actuated condition.

FIGURE 5 illustrates in as little detail as possible one way in which the potentiometers and micro switches may be connected into a circuit for automatic control of gauge in a metal rolling mill. In this circuit the resistor of potentiometers 25, 28 and 29 and the resistor of a Kelvin Varley reference potentiometer are all placed in parallel across an A.C. source, for instance a 40 volt, 400 cycle current supply from the secondary winding of transformer 38. A trimming resistor is placed in series with each potentiometer for calibration purposes, i.e., the trimming resistors 39 to 42 are in series with potentiometers 25, 28, 29 and the Kelvin Varley respectively. Each one of the potentiometers 25, 28 and 29 has its slider in circuit with the normally open contacts of a relay 43, 44 and 45 respectively, and the three circuits are then connected together and to the slider of the Kelvin Varley potentiometer through one winding of transformer 46. Relays 43 to 45 are controlled from another power source by means of micro switches 30 to 32 respectively which also have their contacts normally open. Hence, when the contacts of switch 30 are closed by cam 16, relay 43 is energized, thereby closing its contacts to place potentiometer 25 in a circuit with the Kelvin Varley potentiometer and transformer 46. As long as cam 16 keeps the contacts of switch 30 closed, potentiometer 25 in combination with the reference potentiometer provide the roll position signal fed back into the control system from transformer 46. Switch 31 controls potentiometer 28 through relay 44 and switch 32 controls potentiometer 29 through relay 45, the control in both instances being the same as that described with reference to switch 30. At least one of the potentiometers 25, 28 or 29 is always in circuit with the Kelvin Varley reference potentiometer, therefore, the contacts of at least one of the switches 30, 31 or 32 must always be closed. However, in order to maintain one set of micro switch contacts closed at all times, it will be necessary to set the switches with some overlap of the contacts. That is, there will be brief intervals when two switches have their contacts closed because the next switch selected must close its contacts before the prior switch opens its contacts. It will be noted from FIGURE 5 that the circuit for the relays and switches includes selection logic which serves during this interval of overlap of two switches to select one only of the potentiometers associated with the closed switches, the selection made being based on the potentiometer having its slider nearest the optimum operating position.

The device may be secured to mill structure 51 by means of three cap screws 52, and the two open slides of the frame closed by side plates 48 and 49. An access opening in the center of top wall 103 may be covered by a plate 50.

In actual practice, two complete devices will be provided for each rolling mill, each device will be driven by a separate screw, and both signals will be utilized for control purposes. Although two devices are preferred, it is possible to operate a mill with one device only because the drives for the screws are coupled together mechanically.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A device of the type described comprising a frame; a shaft supported for rotation by said frame; a plurality of potentiometers supported by said frame and coupled to said shaft for rotation thereby simultaneously; a cam operated switch for each potentiometer; at least one cam supported for rotation by said frame and driven by said shaft simultaneously with said potentiometers; and said cam having at least one switch operating portion thereon adapted to operate said switches selectively depending upon the angular position of said cam portion relative to the actuators of the switches, the arrangement being such that at least one of said switches is always in an operated condition; and circuit elements connecting one of said potentiometers to a respective one of said switches.

2. A device of the type described comprising a frame; a shaft supported for rotation by said frame; a gear on one end of said shaft and a cam on the other end thereof; a plurality of potentiometers supported by said frame; a gear on the operating shaft of each potentiometer meshing with the gear on said shaft; a cam operated switch for each potentiometer; said cam having a switch operating portion thereon adapted to operate said switches selectively one at a time depending upon the angular position of the cam portion, the arrangement being such that there is always some overlap in each switching operation between the opening of one switch and the closing of another or vice versa.

3. A device of the type described comprising a frame; a shaft supported for rotation by said frame; a gear on one end of said shaft and a cam on the other end thereof; three similar linear potentiometers supported by said frame in equally spaced relation about said shaft with the operating shaft of each potentiometer parallel to said shaft; a gear on the operating shaft of each potentiometer meshing with the gear on said shaft; a cam operated switch for each potentiometer supported by said frame in equally spaced relation about said cam; said cam having a switch operating portion thereon adapted to operate said switches selectively one at a time depending upon the angular position of the cam portion, the arrangement being such that there is always some overlap in each switching operation between the opening of one switch and the closing of another or vice versa.

References Cited by the Examiner

UNITED STATES PATENTS

| | | | |
|---|---|---|---|
| 2,498,967 | 2/1950 | Schaefer | 338—200 X |
| 2,775,754 | 12/1956 | Sink | 340—179 X |
| 2,871,429 | 1/1959 | Fogiel | 318—29 |
| 3,124,792 | 3/1964 | Thaler | 340—179 |
| 3,158,849 | 11/1964 | Thaler | 340—179 X |

JOHN F. COUCH, *Primary Examiner.*

A. D. PELLINEN, *Assistant Examiner.*